United States Patent [19]

Konda et al.

[11] Patent Number: 4,745,415

[45] Date of Patent: May 17, 1988

[54] THERMAL PRINTER HAVING THERMAL HEAD FOR TRANSFERRING INK OF INK FILM ONTO TRANSFER PAPER

[75] Inventors: Shoji Konda; Iwao Fujii; Yasuhiro Kyoden, all of Sagamihara, Japan

[73] Assignee: Minolta Camera Kabushiki Kaisha, Osaka, Japan

[21] Appl. No.: 20,035

[22] Filed: Feb. 27, 1987

[30] Foreign Application Priority Data

Mar. 7, 1986 [JP] Japan .................................. 61-51020
Mar. 31, 1986 [JP] Japan .................................. 61-75226

[51] Int. Cl.[4] .............................................. G01D 15/00

[52] U.S. Cl. .................................... 346/105; 346/154; 400/54

[58] Field of Search ................ 346/76 PH, 76 R, 105, 346/154; 400/54, 223, 120; 219/216 PH; 364/518, 519

[56] References Cited

U.S. PATENT DOCUMENTS 4,279,523 7/1981 Ringle .................................. 400/54
4,451,834 5/1984 Nakajima et al. .............. 346/76 PH
4,507,667 3/1985 Tsuboi ............................ 346/76 PH
4,551,729 11/1985 Kubo et al. .................... 346/76 PH
4,575,733 3/1986 Hattori et al. ........................ 400/54

*Primary Examiner*—Arthur G. Evans
*Attorney, Agent, or Firm*—Wenderoth, Lind & Ponack

[57] ABSTRACT

A thermal printer comprising a transfer section where an ink film is pressed into tight contact with recording paper for transferring ink from the ink film to the recording paper by means of a thermal head, thereby to form an image on the recording paper. When the printer is switched on, the ink film and the recording paper located at the transfer section are moved onward to a recording paper separating device. The ink film and the recording paper remain in tight contact with each other when the power is cut in a printing operation. However, when the power supply for the printer is resumed, the ink film and the recording paper are moved to the separating means to release the ink film and recording paper from the mutual tight contact, thereby facilitating ink film takeup.

9 Claims, 3 Drawing Sheets

THERMAL PRINTER HAVING THERMAL HEAD FOR TRANSFERRING INK OF INK FILM ONTO TRANSFER PAPER

BACKGROUND OF THE INVENTION (1) Field of the Invention

The present invention relates to a thermal printer comprising a thermal head for carrying out a printing operation, wherein the thermal head applies heat to an ink film to transfer thermally fusbile ink onto transfer or recording paper.

(2) Description of the Prior Art

A known thermal printer such as a color printer employs an ink film carrying a plurality of different color sections or frames arranged longitudinally on the ink film. The ink film, for example as shown in FIG. 2, carries a yellow frame IY, a magenta frame IM and a cyan frame C in series, and a leading position marker MP on a side of the film at a position corresponding to a leading end of each yellow ink frame IY. At the beginning of the printer operation, the ink film is advanced to a predetermined where one of the leading position markers MP is detected by a sensor. The the printing operation is started with yellow.

The type of printer that sets the position of the ink film by means of the leading position markers in advance of printing action as described above, is prone to cause certain inconvenience when power is cut off by some reasons in a printing operation and subsequently the power is turned on again to resume the printing. For example, when the power is cut off in a printing operation, the ink film and the recording paper remain in tight contact with each other at the transfer section. If the power supply is resumed in this state, the ink film cannot be taken up to set its position by means of the leading position marker. Consequently, the leading position marker cannot be detected within a predetermined time period which results in the printer giving a film empty indication. In addition, an ink film feed motor for taking up the ink film is subjected to an overload and becomes overheated under such a situation.

Known examples of thermal printer have been disclosed in U.S. Pat. Nos. 4,451,834 and 4,507,667. The former discloses a thermal printer wherein an ink film and recording paper are maintained in tight contact with each other at a transfer section and an image is printed on the recording paper by means of a thermal head. However, this patent provides no disclosure regarding means for solving the above-noted problem encountered when the power supply is commenced.

The latter patent discloses a thermal printer wherein, prior to printing a first sheet of recording paper, the ink film is advanced by a fixed amount while the thermal head is retracted from a pressure position, in order to smooth out the ink film. However, this patent again discloses nothing to solve the above-noted problem.

SUMMARY OF THE INVENTION

Accordingly, a primary object of the present invention is to provide a novel thermal printer capable of effectively eliminating the tight contact between the ink film and recording paper when the power supply is commenced.

Another object of the present invention is to provide a thermal printer capable of forcibly separating the ink film and recording paper in order to take up the ink film smoothly.

A further object of the invention is to provide a color printer well adapted for use with the ink film carrying a series of color ink frames in particular.

In order to achieve these and other objects, a thermal printer according to a preferred embodiment of the invention comprises means to advance an ink film and recording paper remaining at a transfer section to a recording paper separating device when the power supply is commenced. By advancing the ink film and recording paper, cohering portions of the ink film and recording paper reach the separating device to be forcibly separated. Where the present invention is applied to a color printer, the recording paper separated from the ink film by the separating device is moved back to the transfer section to be printed with a different color.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENT

Figure 1A:
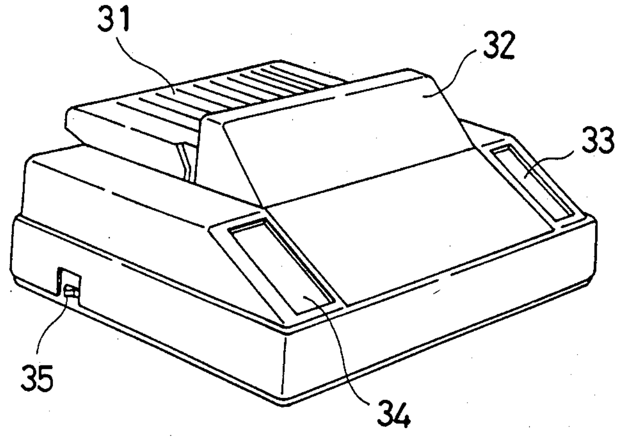
FIG. 1A is a schematic perspective view of a thermal color printer which is one example of printer embodying the present invention.

Referring to FIG. 1A, a thermal color printer shown therein comprises a paper tray 31, a front cover 32, a control panel 33, a color change panel 34 and a power switch 35. This printer has an interior construction as schematically shown in FIG. 1B.

Figure 1B:
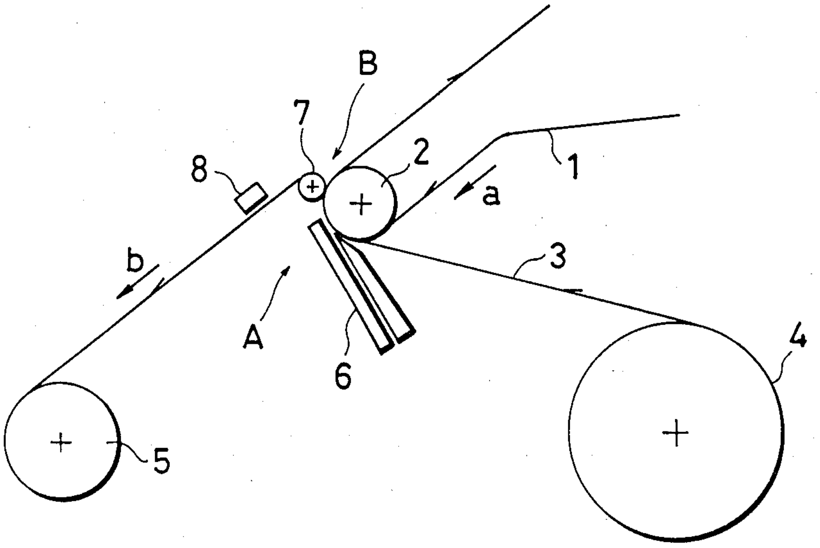
FIG. 1B is a schematic side view of a transfer section and elements adjacent thereto of the thermal printer.

Referring to FIG. 1B, recording paper 1 wound about a planten roller 2 in a transfer section A is movable by a paper feeding device comprising a pulse motor, not shown, in a forward direction referenced a and in a direction opposite thereto. An ink film 3 extends from a supply roller 4 to a takeup roller 5 and is placed in tight contact with the recording paper 1 along a peripheral portion of the planten roller 2. The takeup roller 5 is driven by an ink film feed motor, not shown, to take up the ink film 3 in a direction referenced b. The transfer section A includes a thermal head 6 for applying heat to the ink film to transfer thermally fusible ink to the recording paper 1. A separating roller 7, which is one example of separating means, is disposed at a position spaced from the transfer section A in the film takeup direction b. Further, a sensor 8 is disposed at a position spaced from the separating roller 7 in the film takeup direction b for detecting markers MP, MY, MM and MC marked on the film 3 as shown in FIG. 2.

Figure 2:
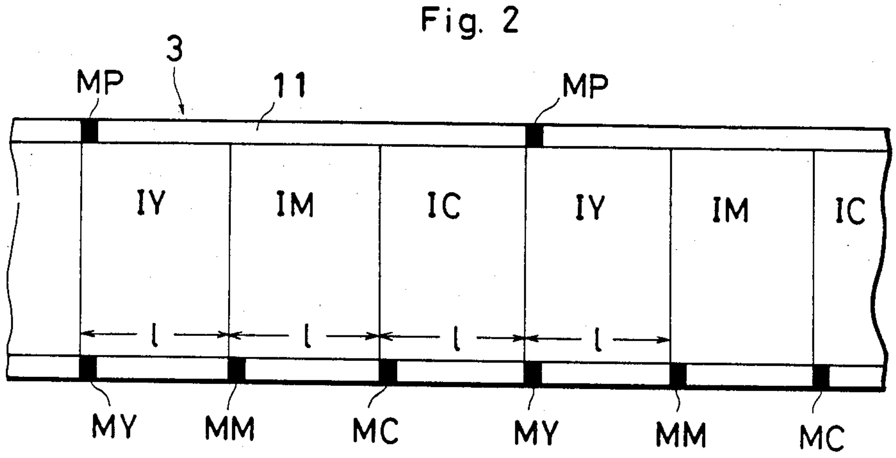
FIG. 2 is a plan view of one example of ink film used with the thermal printer.

The ink film 3 carries a series of color frames each having a predetermined length l as shown in FIG. 2. More particularly, the ink film 3 comprises a film base 11 approximately equal in width to the recording paper 1 and coated with ink frames or layers of three different colors such as yellow Y, magenta M and cyan C, alternating in the mentioned order. The ink film 3 includes the leading position marker MP on one side of the film base 11 at a position corresponding to a leading end of each yellow ink frame IY, and the color markers MY, MM and MC on the other side of the film base 11 at positions corresponding to leading ends of the respective color frames IY, IM and IC.

Figure 3:
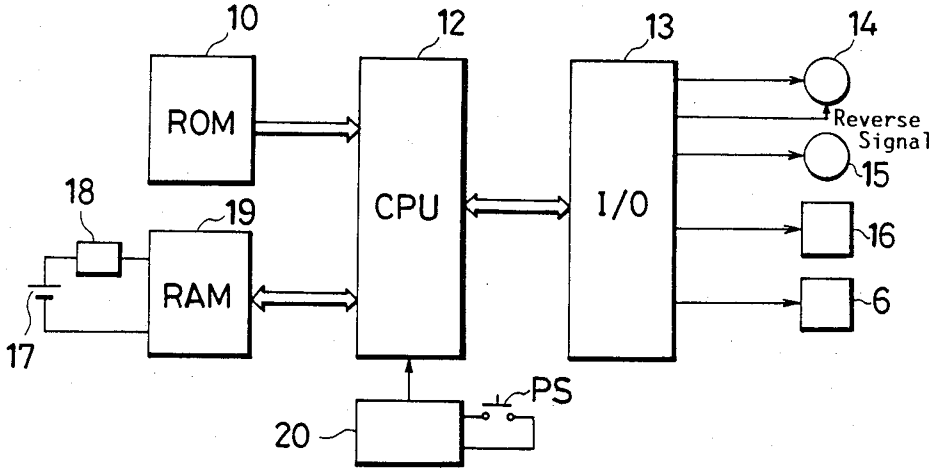
FIG. 3 is a block diagram of a control system for operating the thermal printer.

Color printing is carried out by using the above ink film and under control by a control system as shown in the block diagram of FIG. 3. The control system comprises a ROM 10, a RAM 19, a CPU 12, an I/O port 13 and a power source circuit 20. In FIG. 3, number 14 indicates a paper feed motor (namely the paper feeding pulse motor), number 15 indicates the ink film feed motor, and number 16 indicates a solenoid for pressing the thermal head 6 on the ink film.

A register in RAM 19 sets a print flag to "1" when the printer is printing and resets the print flag to "0" when the printing is completed. Whether the printer is printing or has completed printing is judged, for example, by checking whether or not data read from the memory are transferred to a shift register in the thermal head. The power source circuit 20 supplies power to CPU 12 when the power switch PS is turned on, and cuts off the power when the power switch PS is turned off. RAM 19 is backed up by a backup power source 17 such as a battery. Therefore, the flag remains set even when the output of the power source circuit 20 is inadvertently discontinued during a printing operation. Number 18 in FIG. 3 indicates a relay which is operative when the output of the power source circuit 20 is off and inoperative when the output of the power source circuit 20 is on.

Figure 4:
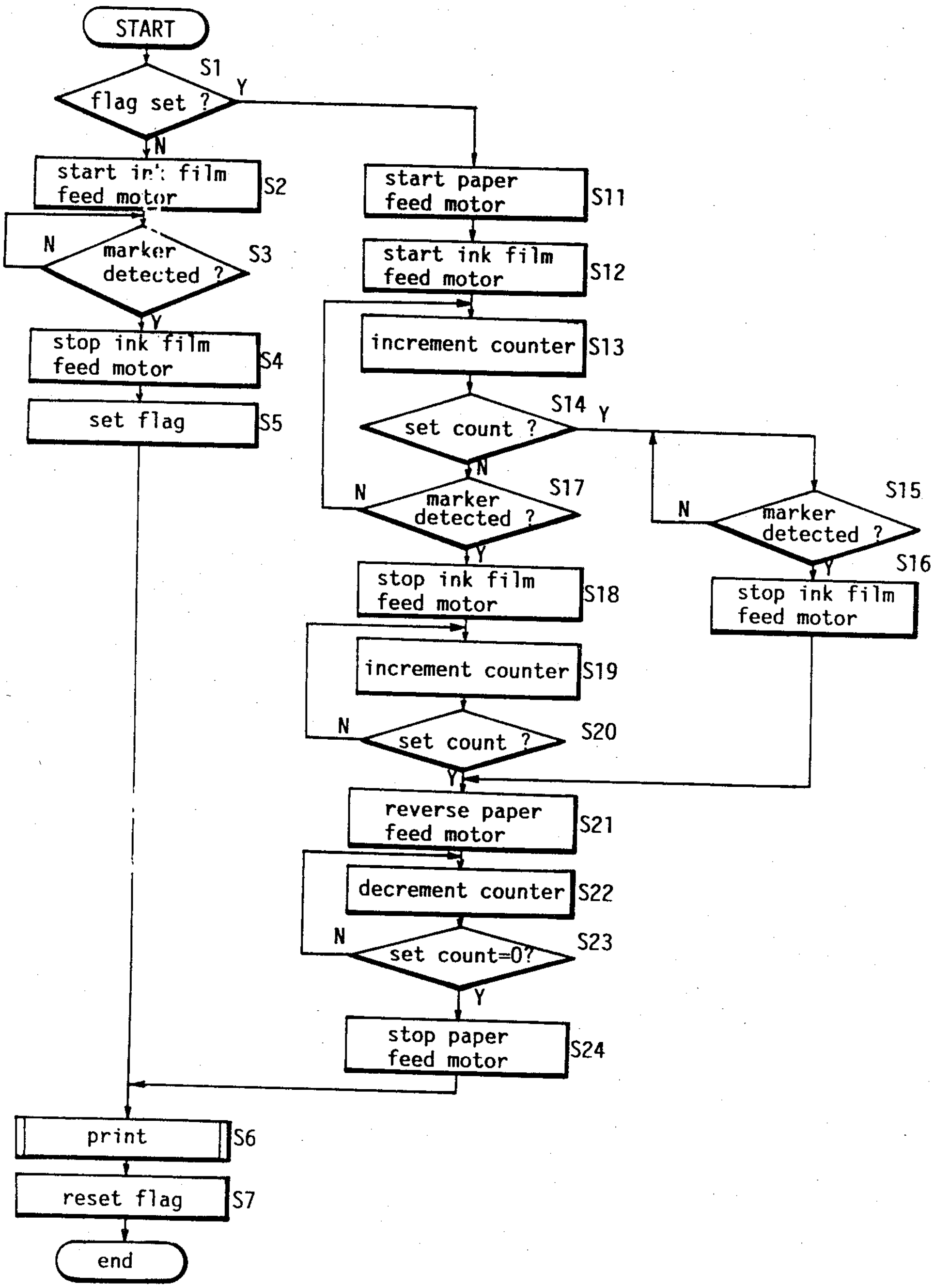
FIG. 4 is a flowchart of the operation of the thermal printer.

How the foregoing thermal color printer operates when power is supplied to CPU 12 will be described hereinafter with reference to the flowchart shown in FIG. 4.

When the power is supplied to CPU 12 by the power source circuit 20, it is first checked at step S1 whether the print flag in RAM 19 is set or not. If the print flag is not set, this means that the power was turned on following a normal printing operation and the program moves on to step S2 and subsequent steps. That is, at steps S2, S3 and S4 the ink film is advanced until the sensor 8 detects a leading position marker MP, at step S5 the print flag is set, and at step S6 a normal printing operation is carried out. After completion of the printing operation the print flag is reset at step S7. It will be understood that the print flag is maintained to be set if the power is cut of when the printing operation is executed.

On the other hand, if the print flag is found to be set at step S1, the program moves on to step S11 and subsequent steps. That is, at step S11 the paper feed motor (which corresponds to the paper feeding device in the foregoing description) is driven to advance the recording paper 1, simultaneously at step S12 the ink film feed motor is driven to advance the ink film 3 in the direction b.

As at step S13, a line counter (not shown) counts the feed amount of the recording paper 1. The counter shows "0" when the recording paper 1 has its leading end located at the transfer section A, and a predetermined count when the leading end of the recording paper 1 reaches a separating position B in FIG. 1.

The program moves from step S14 to step S15 and subsequent steps when the counter reaches the predetermined count before the leading position marker MP of the ink film reaches a position opposed to the sensor 8. The movement of the program from step S14 to step S15 is considered a typical case where the power supply for the printer is cut off when the printing operation is executed, in view of the fact that the distances from the transfer section A to the separating position B and to the sensor 8 are far shorter than the length l of each color frame of the ink film 3. In such a case, both the recording paper and ink film are advanced after the counter reaches the predetermined count until the leading position mark of the ink film is detected, to cause the separating means 7 to break the cohesion between the recording paper and the ink. After the sensor 8 detects the leading position marker MP of the ink film, the ink film advance is stopped at step S16. Then at steps S21 through S23 the paper feed motor is reversed until the counter shows "0". When the counter shows "0", the paper feed motor is stopped at step S24 and the program carries out a normal printing operation.

When the leading position marker MP of the ink film reaches the position opposed to the sensor 8 before the counter reaches the predetermined count, the program moves on to step S18 and subsequent steps. The movement of the program from step S14 to steps S17 and S18 signifies that the leading position marker MP of the ink film was already located between the transfer section A and sensor 8 when the power was switched on. Consequently, this may be the case where the leading position marker of the ink film is detected in error before the counter reaches the predetermined count owing to, for example, the slack of the ink film. In this case, when the sensor 8 detects the leading position marker MP of the ink film, the ink film advance is stopped at step S18. On the other hand, the recording paper is advanced until the counter reaches the predetermined count (at steps S19 and 20). After the counter reaches the predetermined count, the foregoing steps S21 through S24 are executed.

In the described embodiment, checking is made at step S1 whether or to the printer was in the printing state when the power was cut off previously, and steps S11 through S24 are executed only if the printer was in the printing state. However, steps S11 through S24 may be executed upon supply of the power at all times regardless of the state of the printer when the power was cut off previously.

While in the described embodiment a sheet of recording paper is returned to the transfer position at steps S21 through S24, this process is not absolutely necessary.

Furthermore, the color printer is described as an example of thermal printer embodying the present invention. However, the present invention of course is not limited in application to this example but is applicable to all other types of printer in which a leading position of the ink film is set to a predetermined location prior to a printing operation.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A printer comprising:

transfer means for pressing an ink film into tight contact with a recording paper and transferring ink from the ink film to the recording paper by means of a thermal head;

separating means for separating the recording paper from the ink film after the ink is transferred;

means for moving the ink film through transfer means and separating means;

means for moving the recording paper through transfer means and separating means;

power supply means for supplying power for printing;

first control means for controlling the ink film moving means to move the ink film to a first predetermined position when a power interruption occurs during a printing operation and power is then restored; and second control means for controlling the recording paper moving means to move the recording paper to a second predetermined position when a power interruption occurs during a printing operation and power is then restored.

2. A printer as claimed in claim 1, wherein the first control means is adapted to stop the ink film moving means when the ink film reaches the first predetermined position.

3. A printer as claimed in claim 1, wherein the second control means is adapted to drive the recording paper moving means in reverse rotation when the recording paper reaches the second predetermined position, for moving the recording paper backward to a third predetermined position, and subsequently to stop the recording paper moving means.

4. A printer as claimed in claim 3, wherein the second predetermined position corresponds to a position at which the separating means is disposed.

5. A printer as claimed in claim 3, wherein the third predetermined position corresponds to a position at which the transfer means is disposed.

6. A printer comprising:

transfer means for pressing an ink film into tight contact with a recording paper and transferring ink from the ink film to the recording paper by means of a thermal head;

separating means for separating the recording paper from the ink film after the ink is transferred;

means for moving the ink film through transfer means and separating means;

means for moving the recording paper through transfer means and separating means;

power supply means;

memory means for memorizing a stoppage of power supply from the power supply means occurring in a transfer operation by the transfer means; and control means operable in accordance with data stored in the memory means for controlling the ink film moving means and the recording paper moving means after the power supply is resumed.

7. A printer as claimed in claim 6, wherein, when the memory means memorizes the stoppage of power supply occurring in a transfer operation, the control means is adapted, upon resumption of the power supply, to drive the ink film moving means until the ink film reaches a predetermined position, and to drive the recording paper moving means to move the recording paper to the separating means and subsequently to move the recording paper back to the transfer means.

8. A printer as claimed in claim 6, wherein, when the memory means memorizes the stoppage of power supply occuring in a transfer operation, the control means is adapted, upon resumption of the power supply, to drive the ink film moving means until the ink film and the recording paper reach predetermined positions, respectively.

9. A printer as claimed in claim 6, wherein data stored in the memory means are cleared out upon resumption of the power supply.

* * * * *